United States Patent
Hwang

(10) Patent No.: US 11,698,181 B1
(45) Date of Patent: Jul. 11, 2023

(54) GARDEN LIGHT WITH MODULAR DESIGN FOR CONVENIENT PACKAGING AND TRANSPORTATION

(71) Applicant: METROMAX AMERICA CORPORATION, Rowland Heights, CA (US)

(72) Inventor: Christina Hwang, Rowland Heights, CA (US)

(73) Assignee: METROMAX AMERICA CORPORATION, Rowland Heights, CA (US)

( * ) Notice: Subject to any disclaimer, the term of this patent is extended or adjusted under 35 U.S.C. 154(b) by 0 days.

(21) Appl. No.: 17/952,567

(22) Filed: Sep. 26, 2022

(51) Int. Cl.
| F21V 3/04 | (2018.01) |
| F21S 2/00 | (2016.01) |
| F21S 9/03 | (2006.01) |
| F21V 21/08 | (2006.01) |
| F21W 131/109 | (2006.01) |
| F21Y 115/10 | (2016.01) |

(52) U.S. Cl.
CPC .......... *F21V 3/049* (2013.01); *F21S 2/005* (2013.01); *F21S 9/037* (2013.01); *F21V 21/0824* (2013.01); *F21W 2131/109* (2013.01); *F21Y 2115/10* (2016.08)

(58) Field of Classification Search
CPC ...... F21V 3/049; F21V 21/0824; F21S 2/005; F21S 9/037; F21W 2131/105; F21Y 2115/10
See application file for complete search history.

(56) References Cited

U.S. PATENT DOCUMENTS

| 10,240,734 B1 * | 3/2019 | Hwang | H05B 45/20 |
| 10,670,203 B1 * | 6/2020 | Glazer | F21V 17/002 |
| 2012/0243213 A1 * | 9/2012 | Chen | F21S 8/081 |
| | | | 362/183 |
| 2015/0211694 A1 * | 7/2015 | Camenzuli | F21S 8/03 |
| | | | 362/183 |

* cited by examiner

*Primary Examiner* — Peggy A Neils
(74) *Attorney, Agent, or Firm* — Bacon & Thomas, PLLC

(57) ABSTRACT

A garden light with a modular design for convenient packaging and transportation includes a first light set, and a second light set substantially in the same shape of the first light set and proportionally enlarged, and the two light sets include a hollow column, a solar lighting module and a base, and the hollow column of the second light set can be sheathed on the outer periphery of the hollow column of the first light set, such that two bases and two solar lighting modules can be accommodated in the inner periphery of the hollow column of the first light set to reduce the packaging and transportation costs.

9 Claims, 8 Drawing Sheets

GARDEN LIGHT WITH MODULAR DESIGN FOR CONVENIENT PACKAGING AND TRANSPORTATION

FIELD OF THE INVENTION

The present disclosure relates to a garden light, and more particularly to the garden light with a modular design of components and capable of integrating and packaging garden lights of at least two different sizes altogether to reduce the volume and cost of the packaging and transportation of the garden lights.

BACKGROUND OF THE INVENTION

Garden lights are often used in gardens, homes, open-air restaurants or outdoor leisure places, etc. to provide moderate lighting, and to create atmosphere and decoration for the surrounding environment. To take into account the convenience of installation and maintenance, most of the existing garden lights are equipped with solar panel and battery and use solar energy as the power supply for operation to achieve the advantages of environmental protection and energy saving.

There are various types of garden lights, and one of them has a structure including a hollow column that can transmit light, a solar lighting module combined with the top of the hollow column, and a base combined with the bottom of the hollow column. The bottom surface of the base is detachably provided with a conic ground plug, the garden light can be inserted and fixed into the outdoor ground by the ground plug, and the solar lighting module can emit light downward, so that the light can pass from the inside to the outside from the surrounding of the hollow column to create a staggered light effect when glowing at night.

Based on the aforementioned related art structure, this disclosure has modularized the components of the garden light, so that each package of the product includes a hollow column, a solar lighting module, a base and a ground plug, and the solar lighting module, the base and the ground plug can be installed on the hollow column easily and provided for consumers to install on their own after purchase.

After the aforementioned packaging method of this disclosure has been implemented for a period of time, it is found that the method provides convenience in packaging, transportation, sales and use, but due to the difference in the scale and location of the consumers' use, there is a need for different sizes of garden lights. For example, a larger garden light may be required to enhance lighting around the pool in the garden, and a smaller garden light may be selected on both sides of the path to create atmosphere.

In addition, most garden lights sold on the market are usually cylindrical or square columns, and this structure makes the solar lighting module and the base in the shape of a circle or a square with equal sides, so that the solar lighting module and the base cannot be placed into the hollow column, and the packaging volume of the garden light cannot be reduced.

In view of the above problem, this discloser believes that if at least two different sized garden lights can be modularized and integrated into a package, such design will not only provide consumers with a variety of sizes and convenience in use, but also will minimize the need for separate packaging and reduce the shipping volume and cost.

SUMMARY OF THE INVENTION

Specifically, the present disclosure is directed to a garden light with a modular design for convenient packaging and transportation, which includes a first light set, and a second light set with substantially the same shape of the first light set and proportionally enlarged.

The first light set includes a first hollow column, a first solar lighting module, and a first base, and the first hollow column has an inner periphery, an outer periphery, a top end provided for installing the first solar lighting module, and a bottom end provided for installing the first base, and the top end and bottom end are communicated with each other, such that the first hollow column forms an accommodation space within a range of the inner periphery of the first hollow column.

The second light set includes a second hollow column, a second solar lighting module, and a second base, and the second hollow column has an inner periphery, an outer periphery, an inner periphery, an outer periphery, a top end provided for installing the second solar lighting module, and a bottom end provided for installing the second base, and the top end and bottom end are communicated with each other, such that the second hollow column forms a fitting part within a range of the inner periphery of the second hollow column The fitting part of the second hollow column has a size greater than the size of the outer periphery of the first hollow column, so that the fitting part of the second hollow column can be sheathed on the outer periphery of the first hollow column, and any two of the first and second solar lighting modules and the first and second bases can be freely selected to be stacked with each other in pairs, and then accommodated in the accommodation space of the first hollow column, in order to integrate and package the different sized light sets that are originally needed to be packaged separately.

In an embodiment, the garden light further includes a third light set having a shape substantially the same as that of the second light set and proportionally enlarged, and the hollow column of the third light set can be sheathed on the outer periphery of the second hollow column, and any two of the first, second and third solar lighting modules and the first, second and third bases can be freely selected to be stacked with each other in pairs, and then accommodated into the accommodation space of the first hollow column.

Compared with the related art, the solar lighting module and the base of the hollow column of the garden light in accordance with this disclosure are modularized, so that the garden lights of at least two different sizes can be integrated and packaged altogether, thereby not only providing consumers with a variety of sizes to choose from, but also protecting the plurality of bases and the plurality of solar lighting modules inside by the outermost hollow column, and reducing the volume and cost of packaging and transportation.

The objectives, technical characteristics and effects of the present invention will become apparent with the detailed description of preferred embodiments accompanied with the illustration of related drawings. It is intended that the embodiments and drawings disclosed herein are to be considered illustrative rather than restrictive.

DESCRIPTION OF THE PREFERRED EMBODIMENTS

Figure 1:
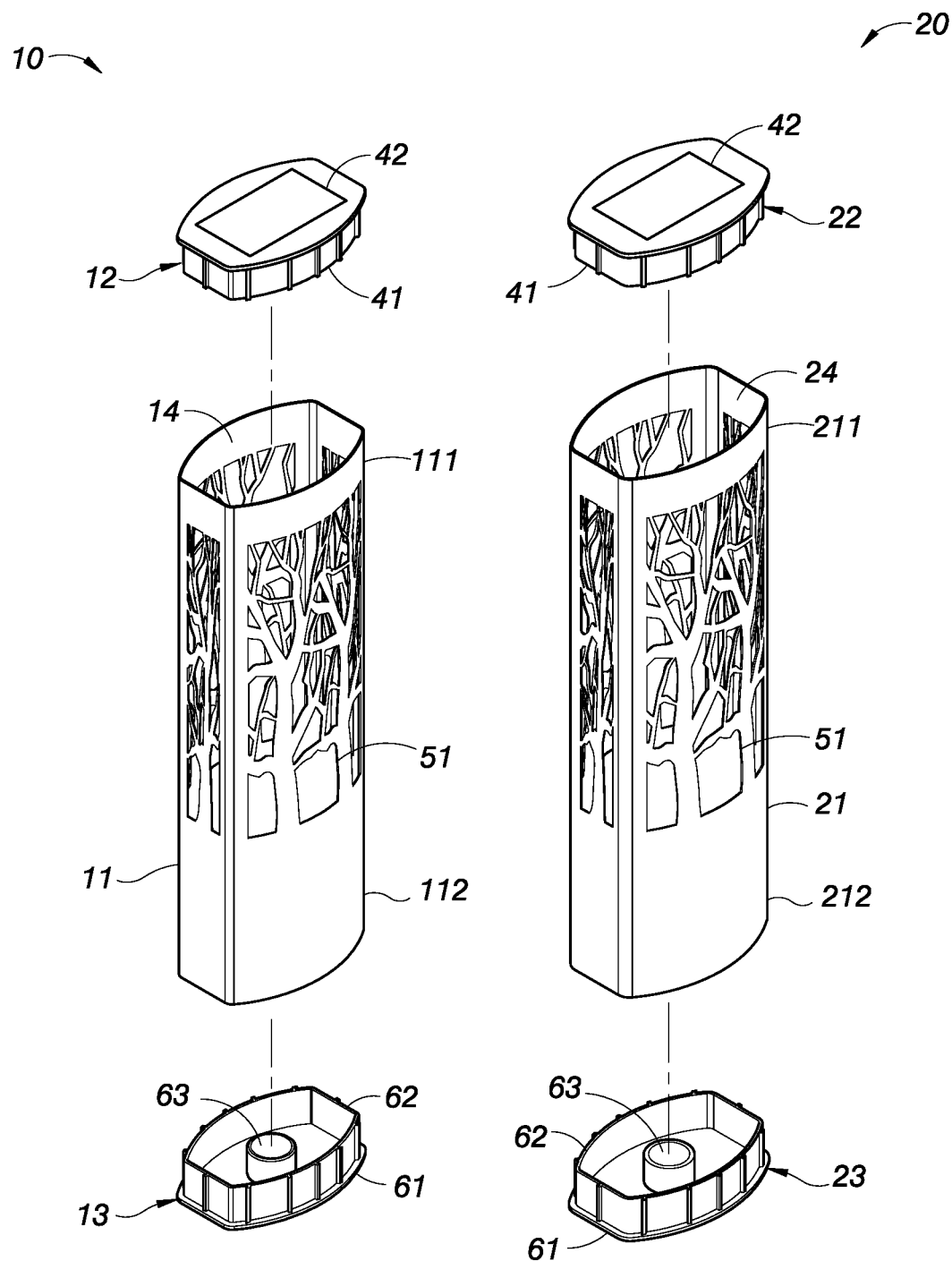
FIG. 1 is an exploded view of a first light set and a second light set of this disclosure.
Figure 2:
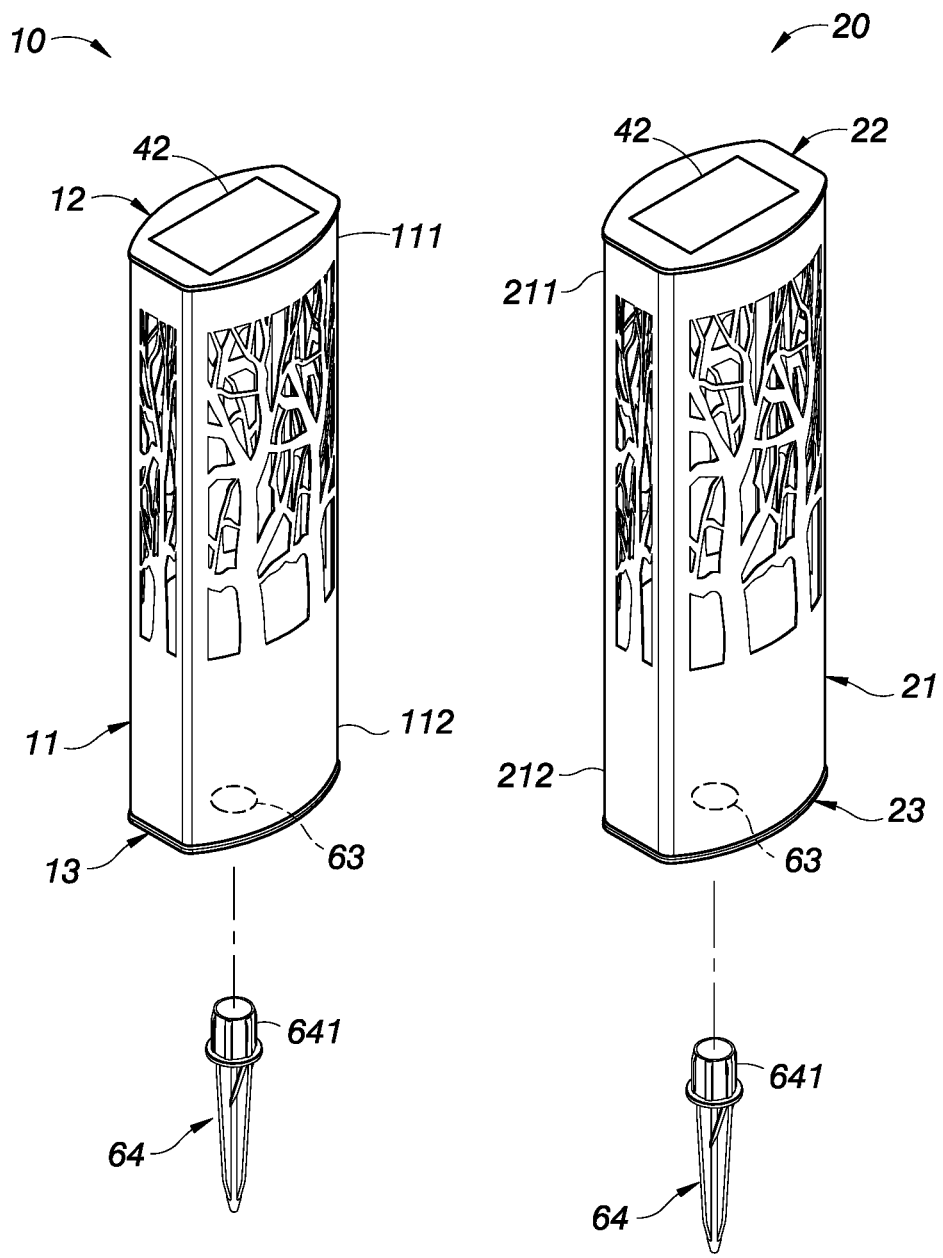
FIG. 2 is a schematic view showing the assembly of this disclosure.

With reference to FIGS. 1 and 2 for a garden light with a modular design for convenient packaging and transportation in accordance with this disclosure, the garden light includes a first light set 10, and a second light set 20 having a shape substantially the same as that of the first light set 10 and proportionally enlarged.

The first light set 10 includes a first hollow column 11, a first solar lighting module 12 detachably installed at a top end 111 of the first hollow column 11, and a first base 13 detachably installed at a bottom end 112 of the first hollow column 11, and the top end 111 and the bottom end 112 of the first hollow column 11 are communicated with each other, so that the first hollow column 11 forms an accommodation space 14 within a range of the inner periphery of the first hollow column 11.

The second light set 20 includes a second hollow column 21, a second solar lighting module 22 detachably installed at a top end 211 of the second hollow column 21, and a detachably installed at a bottom end 212 of the second hollow column 21, and the top end 211 and the bottom end 212 of the second hollow column 21 are communicated with each other, so that the second hollow column 21 forms a fitting part 24 within a range of the inner periphery of the second hollow column 21.

Figure 3:
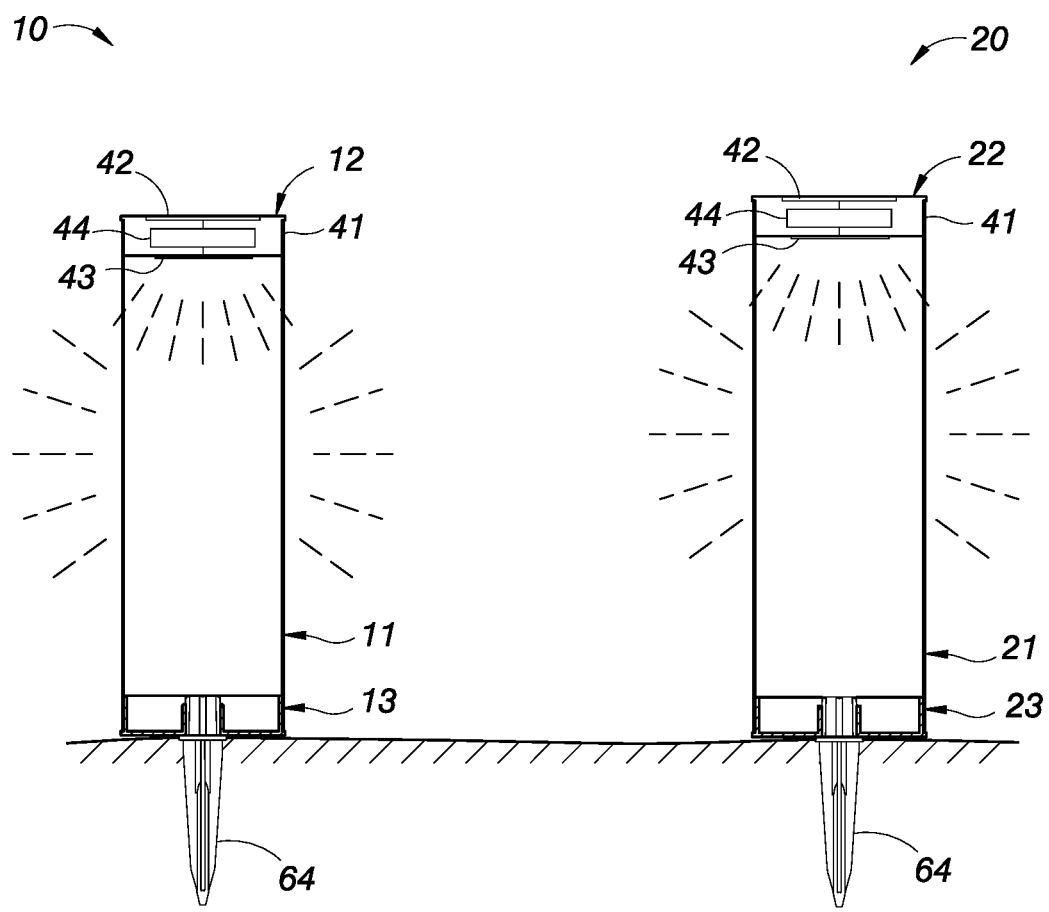
FIG. 3 is a schematic view showing an application of the first and second light sets of this disclosure.

In FIG. 3, the first light set 10 and the second light set 20 further include a regular insert part 64 separately, and each insert part 64 is disposed under the corresponding first base 13 or second base 23. During use as shown in the figure, the bottom of each insert part 64 is in substantially in an downwardly tapered conical shape, such that each light set can be inserted into an outdoor ground and fixed by the insert part 64, and the lights emitted downwardly from the first solar lighting module 12 and the second solar lighting module 22 can be transmitted from the inside to the outside through the periphery of the hollow first and second columns 11, 21.

Figure 4:
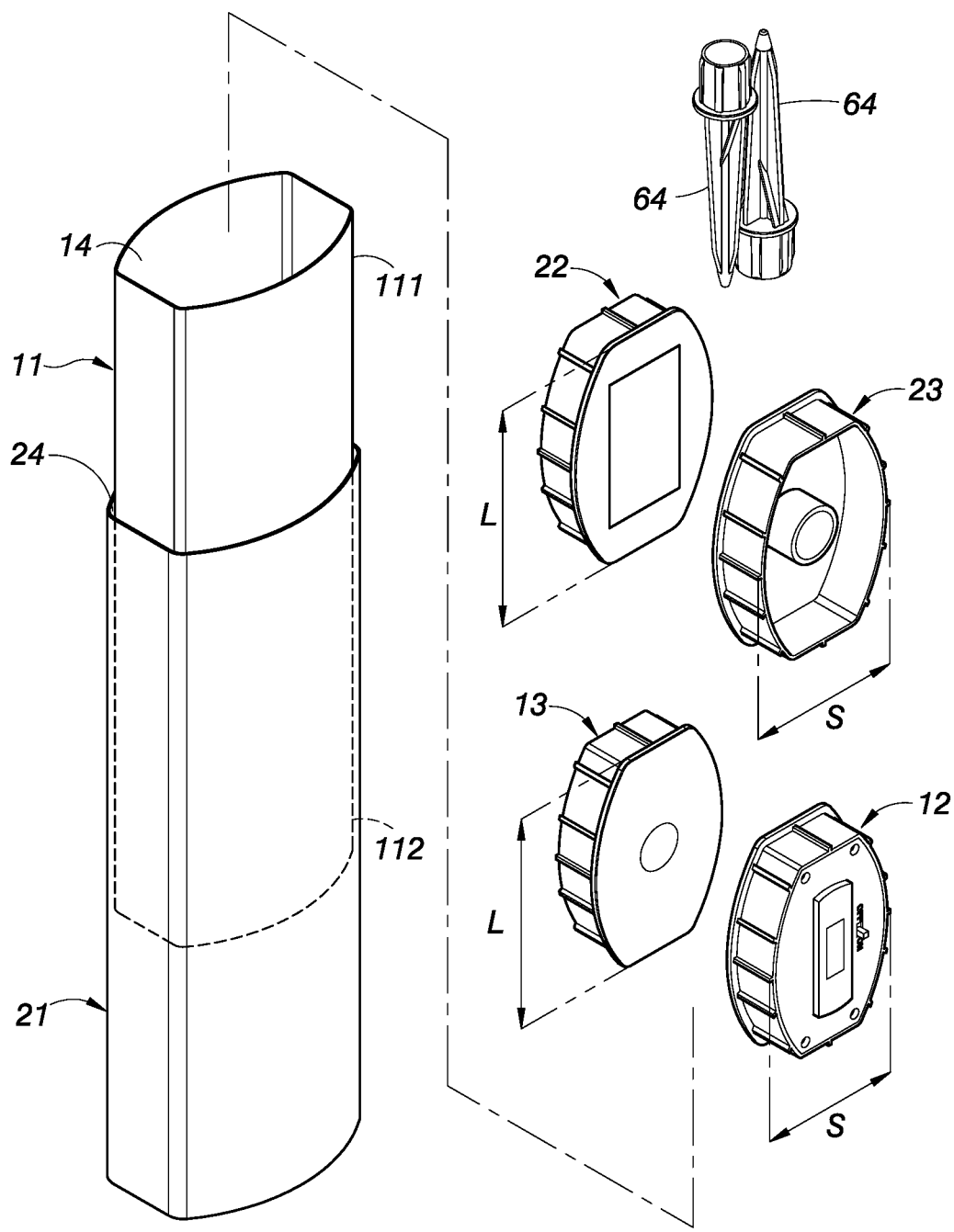
FIG. 4 is a schematic view showing the assembly of this disclosure during the packaging of the first and second light sets.
Figure 5:
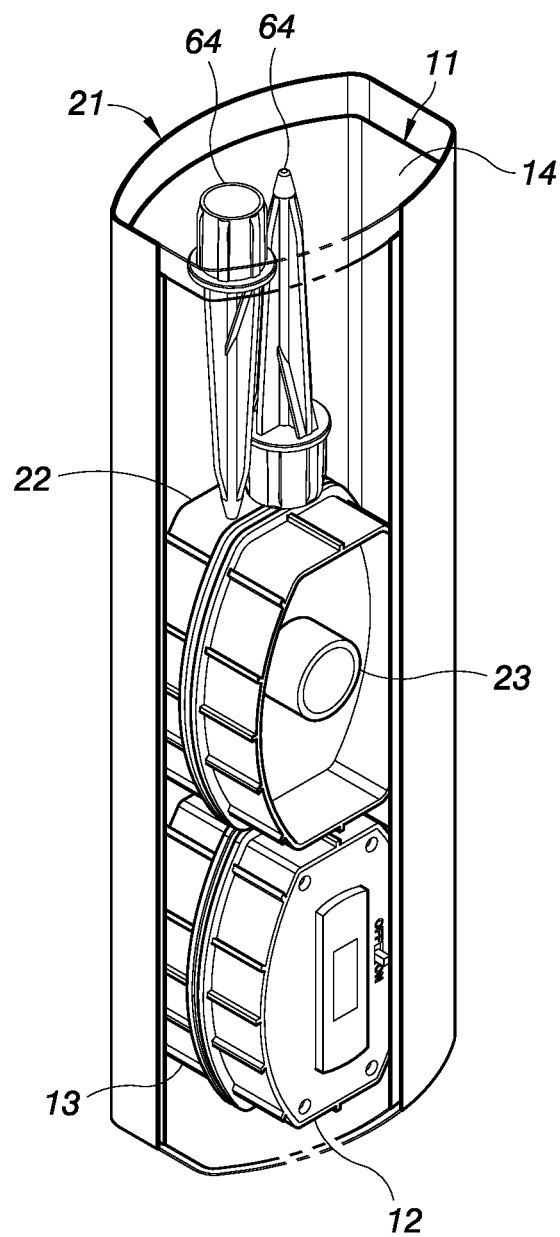
FIG. 5 is a cross-sectional view showing the assembly of this disclosure during the packaging of the first and second light sets.

The hollow column, the solar lighting module and the base of each garden light are modularized, so that two different sized light sets can be integrated and packaged altogether. In FIGS. 4 and 5, the size of the fitting part 24 of the second hollow column 21 is greater than the size of the outer periphery of the first hollow column 11, so that the fitting part 24 of the second hollow column 21 can be sheathed on the outer periphery of the first hollow column 11, and any two of the first and second solar lighting modules 12, 22 and the first and second bases 13, 23 can be freely selected to be stacked with each other in pairs, and then accommodated in the accommodation space 14 of the first hollow column 11. In this way, different sized light sets can be integrated and packaged to reduce the volume and cost of the packaging and transportation significantly.

Figure 6:
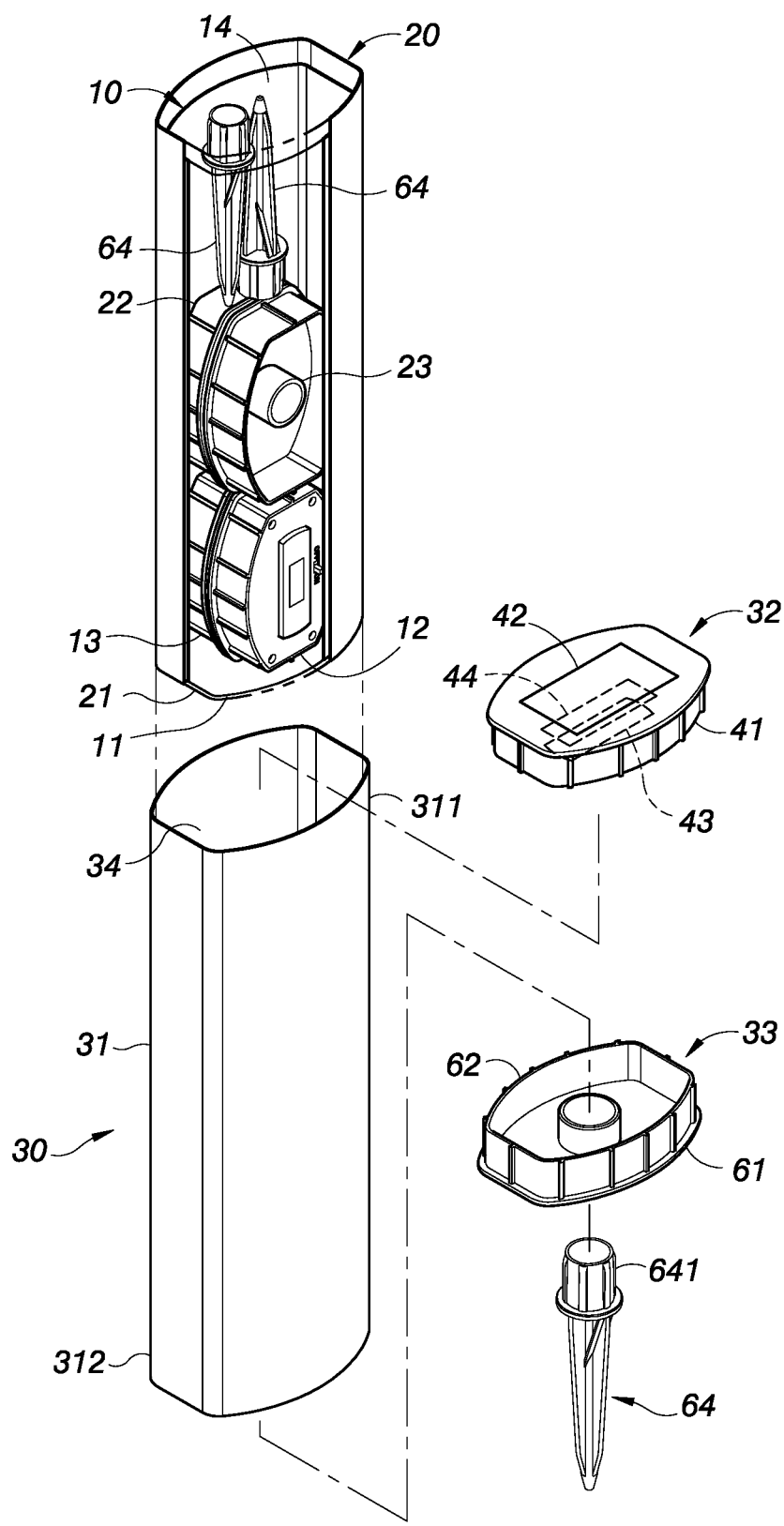
FIG. 6 is a schematic view of combining the first, second and third light sets of this disclosure.
Figure 7:
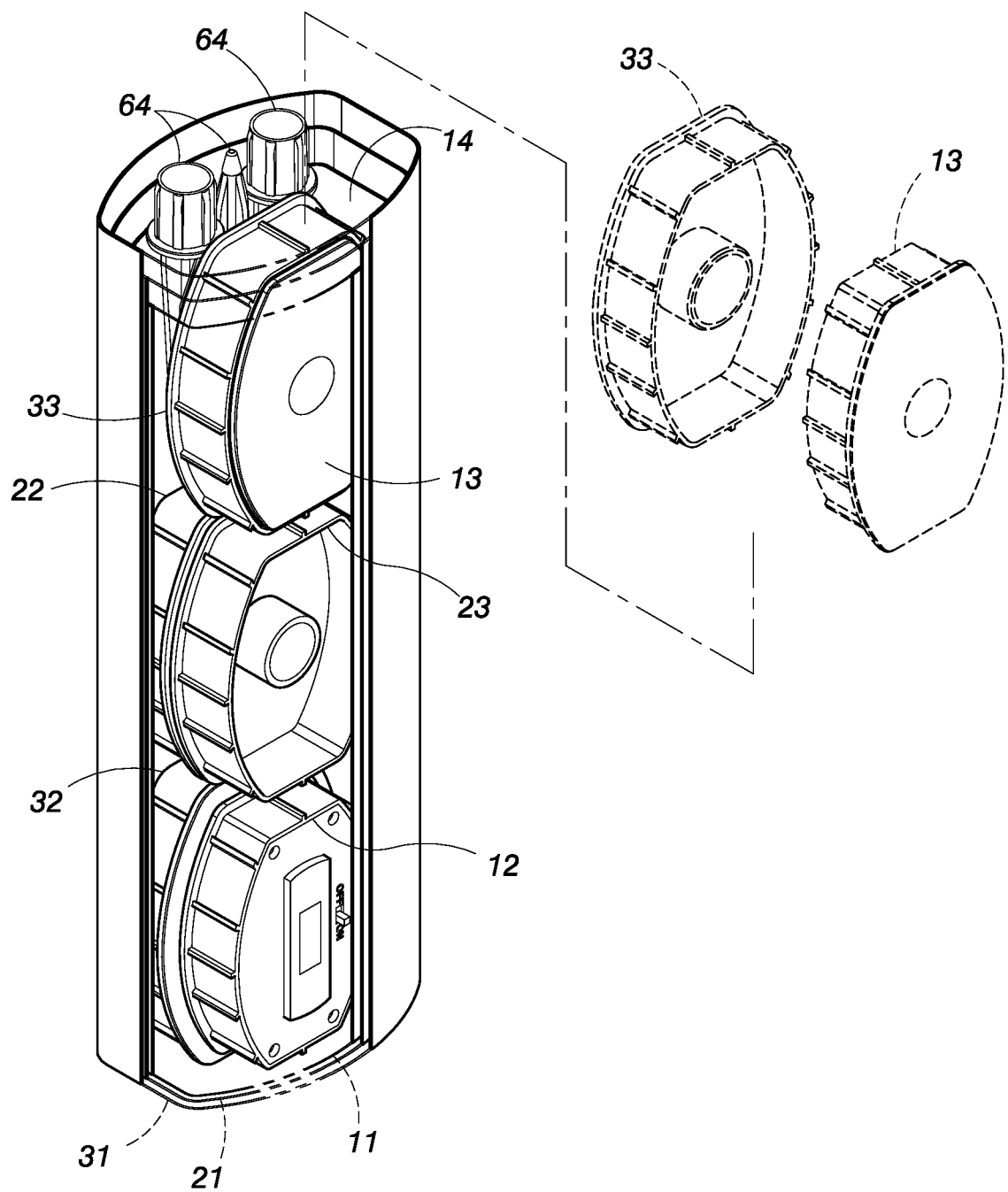
FIG. 7 is a cross-sectional view showing the assembly of this disclosure during the packaging of the first, second and third light sets.

The modular design of the garden light is not limited to the integration of two light sets into a package only. In FIG. 6, the garden light further includes a third light set 30 having a shape substantially the same as the second light set 20 and proportionally enlarged, and the third light set 30 includes a third hollow column 31, a third solar lighting module 32 detachably installed at a top end 311 of the third hollow column 31, and a third base 33 detachably installed at a bottom end 312 of the third hollow column 31, and the top end 311 and the bottom end 312 of the third hollow column 31 are communicated with each other, so that the inner periphery of the third hollow column 31 forms a fitting part 34.

The size of the fitting part 34 of the third hollow column 31 is greater than the size of the outer periphery of the second hollow column 21, so that the fitting part 34 of the third hollow column 31 can be sheathed on the outer periphery of the second hollow column 21, and any two of the first, second, and third solar lighting modules 12, 22, 32 and the first, second and third bases 13, 23, 33 can be freely selected to be stacked with each other in pairs as shown in the figure, and then accommodated into the accommodation space 14 of the first hollow column 11 to achieve the effect of integrating and packaging different sized garden lights.

In the figure, the first and third solar lighting modules 12, 32 are stacked with each other in a direction from top to bottom, and the second solar lighting module 22 and the second base 23 are stacked with each other, and the first and third bases 13, 33 are stacked with each other.

By the aforementioned structure, the hollow column, the solar lighting module and the base of the garden light of this disclosure are modularized, so that different sized garden lights can be integrated and packaged altogether, thereby not only providing consumers with a variety of sizes to choose from, but also protecting the plurality of bases and the plurality of solar lighting modules inside by the outermost hollow column, and reducing the volume and cost of packaging and transportation.

Figure 8:
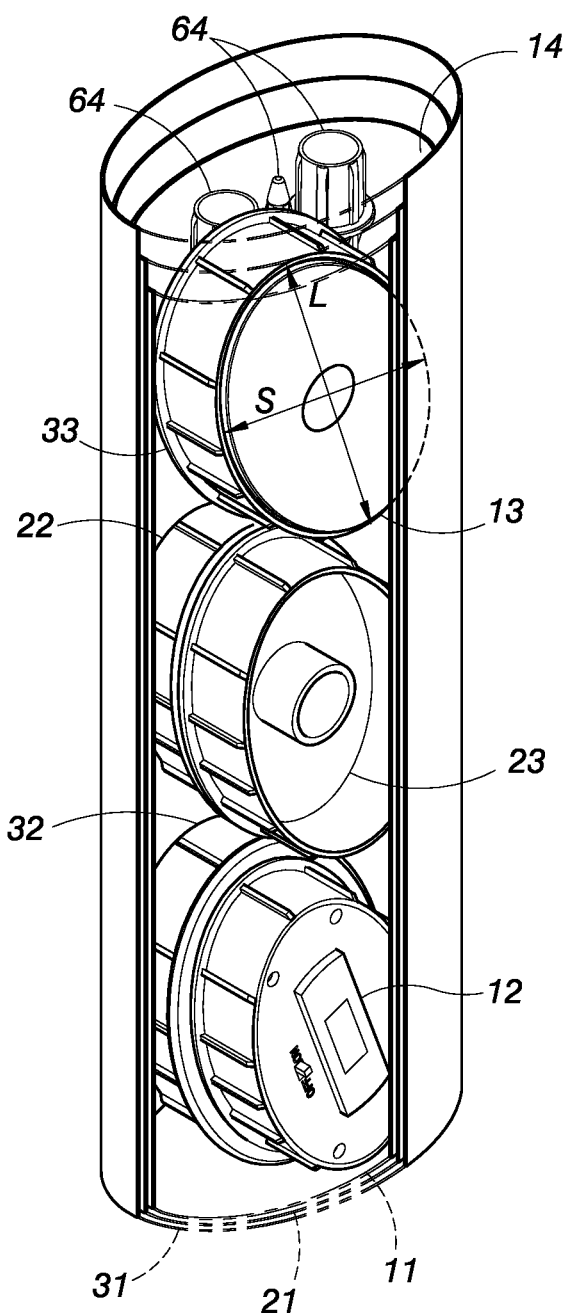
FIG. 8 is a cross-sectional view showing the assembly of another embodiment of this disclosure during the packaging process.

The implementation of each component of this disclosure is further described below:

In FIGS. 1 to 7, the first hollow column 11, the second hollow column 21, and the third hollow column 31 are substantially in a rectangular column shape or an elliptical shape (as shown in FIG. 8), and the first, second, and third solar lighting modules 12, 22, 32 and the first, second, and third bases 13, 23, 33 are also substantially in a rectangular column shape or an elliptical shape, and these two shapes make each solar lighting module and each base form a long side L and a short side S, and any two of the first, second, and third solar lighting modules 12, 22, 32 and the first, second, and third bases 13, 23, 33 are stacked on top of each other, and then placed into the accommodation space 14 (as shown in FIG. 4) in the direction from the top end 111 or the bottom end 112 of the first hollow column 11 along the short side S, thereby overcoming the issues of the traditional garden light that is in a cylindrical or square column shape, and the solar lighting module and base with equal sides cannot be placed in the hollow column to reduce the packaging volume.

In FIGS. 1, 3 and 6, the first, second, and third solar lighting modules 12, 22, 32 separately include a shell 41, and the top side of each shell 41 is installed with a solar panel 42, and the bottom side of each shell 41 is installed with an LED circuit board 43, and the interior of each shell 41 is installed with a battery 44. When each solar lighting module is installed to the top end 111, 211, 311 of the corresponding hollow column, the solar panel 42, the battery 44 and the LED circuit board 43 are electrically connected to each other, so that each LED circuit board 43 can emit light downwardly. In addition, the first, second, and third hollow column 11, 21, 31 separately have a hollow pattern 51 penetrating the inside and the outside, and the light emitted downwardly from the LED circuit board 43 of each solar lighting module can be transmitted can be passed through the hollow pattern 51 and transmitted to the outside to create a light and shadow effect. In an embodiment as shown in the figure, the hollow pattern 51 is disposed at the first and second hollow columns 11, 21.

In an embodiment, the first, second, and third bases 13, 23, 33 separately have a bottom plate 61, and a periphery wall 62 erected around the inner periphery of the bottom plate 61, and the outer periphery of each periphery wall 62 is embedded into the inner periphery of the bottom end 112, 212, 312 of the corresponding first, second or third hollow column 11, 21, 31.

In addition, the bottom plate 61 of each base has a positioning socket 63 provided for detachably installing and positioning the insert part 64, and the top of each insert part 64 is provided with a plug column 641, and the plug column 641 can be inserted into the positioning socket 63 for positioning, or removed from the positioning socket 63 of the corresponding base and then accommodated in the accommodation space 14 of the first hollow column 11.

While the invention has been described by means of specific embodiments, numerous modifications and variations could be made thereto by those skilled in the art without departing from the scope and spirit of the invention as set forth in the claims.

What is claimed is:

1. A garden light with a modular design for convenient packaging and transportation, comprising a first light set, and a second light set having a shape substantially the same as that of the first light set and proportionally enlarged, characterized in that:
    the first light set comprises a first hollow column, a first solar lighting module, and a first base, and the first hollow column comprises an inner periphery, an outer periphery, a top end provided for installing the first solar lighting module, and a bottom end provided for installing the first base, and the top end and bottom end are communicated with each other, such that the first hollow column forms an accommodation space within a range of the inner periphery of the first hollow column;
    the second light set comprises a second hollow column, a second solar lighting module, and a second base, and the second hollow column comprises an inner periphery, an outer periphery, a top end provided for installing the second solar lighting module, and a bottom end provided for installing the second base, and the top end and bottom end are communicated with each other, such that the second hollow column forms a fitting part within a range of the inner periphery of the second hollow column; and
    the fitting part of the second hollow column has a size greater than the size of the outer periphery of the first hollow column, so that the fitting part of the second hollow column can be sheathed on the outer periphery of the first hollow column, and any two of the first and second solar lighting modules and the first and second bases can be freely selected to be stacked with one another in pairs, and accommodated in the accommodation space of the first hollow column, in order to integrate and package the different sized light sets that are originally needed to be packaged separately.

2. The garden light with a modular design for convenient packaging and transportation according to claim 1, wherein the first and second hollow columns are in a substantially rectangular shape or elliptical shape, and the first and second solar lighting modules and the first and second bases are in a substantially rectangular shape or elliptical shape, and each solar lighting module and each base separately comprise at least one long side and at least one short side, and any two of the first and second solar lighting modules and the first and second bases are freely selected to be stacked with each other in pairs and then placed into the accommodation space in a direction from the short side to the top end or bottom end of the first hollow column.

3. The garden light with a modular design for convenient packaging and transportation according to claim 2, further comprising a third light set having a shape substantially the same as that of the second light set and proportionally enlarged, and the third light set comprising a third hollow column, a third solar lighting module, and a third base, and the third hollow column comprising an inner periphery, an outer periphery, a top end provided for installing the third solar lighting module, and a bottom end provided for installing the third base, and the top end and the bottom end are communicated with each other, such that the third hollow column forms a fitting part within a range of the inner periphery of the third hollow column; wherein, the fitting part of the third hollow column has a size greater than the size of the outer periphery of the second hollow column, such that the fitting part of the third hollow column can be sheathed on the outer periphery of the second hollow column, and any two of the first, second and third solar lighting modules and the first, second and third bases can be freely selected to be stacked with each other in pairs, and then accommodated into the accommodation space of the first hollow column.

4. The garden light with a modular design for convenient packaging and transportation according to claim 3, wherein the third hollow column is in a substantially rectangular shape or elliptical shape corresponding to the second hollow column and the third solar lighting module is in a substantially rectangular shape or elliptical shape corresponding to the third base, and the third solar lighting module and the third base separately comprise at least one long side and at least one short side, and any two of the first, second and third solar lighting modules and the first, second and third bases are freely selected to be stacked with each other in pairs, and then placed into the accommodation space in a direction from the short side to the top end or bottom end of the first hollow column.

5. The garden light with a modular design for convenient packaging and transportation according to claim 4, wherein the first, second, third solar lighting module separately comprise a shell, and each shell comprises a top and a bottom, and the top of each shell top is provided with a solar panel, and the bottom of each shell is provided with an LED circuit board, and the interior of each shell is provided with a battery; and the solar panel, the battery and the LED circuit board of each solar lighting module are electrically coupled to each other, so that the light downwardly emitted by each LED circuit board can be transmitted from the inside to the outside through the periphery of the first, second or third hollow column.

6. The garden light with a modular design for convenient packaging and transportation according to claim 5, wherein the first, second, and third hollow columns separately comprise a hollow pattern penetrating through the inside and outside, so that the light downwardly emitted by each LED circuit board can be passed from the inside to the outside through the corresponding hollow pattern.

7. The garden light with a modular design for convenient packaging and transportation according to claim 4, wherein the first, second, and third bases separately comprise a bottom plate, and a periphery wall erected around the inner periphery of the bottom plate, and the outer periphery of each periphery wall is embedded into the inner periphery of the bottom end of the first, second or third hollow column.

8. The garden light with a modular design for convenient packaging and transportation according to claim 7, wherein the bottom plate of each base is provided with a positioning socket, and each positioning socket is provided for detachably plugging and positioning an insert part, and each insert part after being removed from the corresponding base can be accommodated in the accommodation space of the first hollow column.

9. The garden light with a modular design for convenient packaging and transportation according to claim 8, wherein each insert part comprises a top and a bottom, and the top of each insert part is provided with a plug column, and the plug column can be plugged into the corresponding positioning socket, and the bottom of each insert part is in an upwardly tapered conical shape.

* * * * *